United States Patent
Strizki et al.

(10) Patent No.: US 8,997,336 B2
(45) Date of Patent: *Apr. 7, 2015

(54) AIR-TIGHT AND WATER-TIGHT ELECTRICAL BONDING DEVICE

(75) Inventors: Michael Strizki, Hopewell, NJ (US); Jason Snyder, Flemington, NJ (US); James Strizki, Hopewell, NJ (US)

(73) Assignee: Renewable Energy Holdings, LLC, Flemington, NJ (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/608,540

(22) Filed: Sep. 10, 2012

(65) Prior Publication Data

US 2014/0068930 A1  Mar. 13, 2014

(51) Int. Cl.
*H01R 4/34* (2006.01)
*F16B 43/00* (2006.01)

(52) U.S. Cl.
CPC .............. *H01R 4/34* (2013.01); *F16B 43/001* (2013.01)

(58) Field of Classification Search
USPC ......... 29/57, 825, 874, 876, 281.5, 33.2, 729, 29/745; 411/326, 353, 366.1, 369, 371.1, 411/371.2, 542
See application file for complete search history.

(56) References Cited

U.S. PATENT DOCUMENTS

| | | |
|---|---|---|
| 1,639,637 A | 8/1927 | Hawley |
| 2,236,235 A | 3/1941 | Head |
| 2,795,444 A | 6/1957 | Nenzell |
| 2,895,524 A * | 7/1959 | Boyd .............................. 411/135 |
| 2,983,534 A | 5/1961 | Heller et al. |
| 3,040,796 A | 6/1962 | Gouverneur |
| 3,203,459 A | 8/1965 | Coldren |
| 3,265,107 A | 8/1966 | Glicksman |
| 3,389,734 A | 6/1968 | Gutshall |
| 3,399,589 A | 9/1968 | Breed |
| 3,520,342 A | 7/1970 | Scheffer |
| 3,540,509 A | 11/1970 | Gutshall |
| 3,588,787 A * | 6/1971 | Kindell et al. ................ 439/434 |
| 3,605,845 A | 9/1971 | Junker |
| 3,606,357 A | 9/1971 | Yonkers |
| 3,626,357 A * | 12/1971 | Kindell et al. ................ 439/433 |
| 3,635,272 A | 1/1972 | Scheffer |
| 3,825,051 A | 7/1974 | Sigmund |
| 3,945,704 A | 3/1976 | Kraus et al. |
| 4,022,262 A | 5/1977 | Gunn |
| 4,023,882 A | 5/1977 | Pettersson |

(Continued)

FOREIGN PATENT DOCUMENTS

GB  2360076 A  12/2001

OTHER PUBLICATIONS

ACME PV Peripherals—WEEB:Washer, Electrical Equipment Bond; promotional sheet from Wiley Electronics, Saugerties, NY; 2009.

*Primary Examiner* — David Angwin
*Assistant Examiner* — Kaying Kue
(74) *Attorney, Agent, or Firm* — Brown & Michaels, PC

(57) ABSTRACT

A bonding device electrically bonds metallic surfaces through serrated metal teeth which embed into each metal surface as a fastener is tightened. A sealing material circumferentially outward and inward from the teeth create an air-tight and water-tight seal around the teeth, protecting the bonding location. The device can have an extended central collar extending axially from the through-hole in the center of the device, which will allow it to be installed in holes, or on a stud without the use of adhesives or other retaining methods.

11 Claims, 4 Drawing Sheets

(56) References Cited

U.S. PATENT DOCUMENTS

| | | |
|---|---|---|
| 4,094,352 A | 6/1978 | Hlinsky |
| 4,223,711 A | 9/1980 | Tabor |
| 4,482,278 A | 11/1984 | Dorn |
| 4,639,175 A | 1/1987 | Wollar |
| 4,812,095 A | 3/1989 | Piacenti et al. |
| 4,873,763 A | 10/1989 | Volonta et al. |
| 5,454,675 A | 10/1995 | DeHaitre |
| 5,957,641 A | 9/1999 | Bogatz et al. |
| 6,231,286 B1 | 5/2001 | Bogatz et al. |
| 6,244,807 B1 | 6/2001 | Garcia |
| 6,347,708 B1 | 2/2002 | Ostergaard |
| 6,817,817 B2 | 11/2004 | Dembowsky et al. |
| 7,014,406 B2 | 3/2006 | Robertson |
| 7,354,075 B2 | 4/2008 | Hagen |
| 7,597,516 B2 | 10/2009 | Bucciferro et al. |
| 7,645,105 B2 * | 1/2010 | Hengel et al. .................. 411/171 |
| 7,806,377 B2 * | 10/2010 | Strizki .......................... 248/200 |
| 8,070,404 B1 | 12/2011 | Schluter |
| 8,092,129 B2 | 1/2012 | Wiley et al. |
| 8,777,538 B2 * | 7/2014 | Strizki et al. ............... 411/371.1 |
| 2005/0153586 A1 * | 7/2005 | Girinon ........................... 439/92 |

\* cited by examiner

AIR-TIGHT AND WATER-TIGHT ELECTRICAL BONDING DEVICE

BACKGROUND OF THE INVENTION

1. Field of the Invention

The invention pertains to the field of electrical bonding devices. More particularly, the invention pertains to electrical bonding washers having seals against corrosion induced by air and water.

2. Description of Related Art

Bonding devices are commonly used for bonding electrical assemblies, such as frames for solar panel supports or the like. These are often in the form of external tooth lockwashers, which have a flat central section and twisted teeth around the perimeter of the washer. The device is placed between the frames, and a fastener such as a bolt or screw passes through the frames and the center of the washer. When the fastener is tightened, the twisted teeth bite into the facing surfaces of the frames to penetrate any surface corrosion or coating and create a good electrical connection.

Wiley Electronics of Saugerties, N.Y., sells a line of bonding devices called WEEB (Washer, Electrical Equipment Bonding) connectors, which are used in assembling and grounding outdoor electrical equipment such as photovoltaic solar panel arrays and the like.

A problem with the prior art is that environmental elements such as the WEEB system is that air and water are free to pass around the teeth of the washer. Over time the washer, or the surfaces of the frames into which the teeth are biting, can corrode by exposure to air and water. This allows the electrical connection between the frames to degrade.

U.S. Pat. No. 2,895,524, entitled "Twisted tooth lock washer having anti-skid body section", is a toothed washer has a resilient o-ring around its inner diameter which is intended to keep the washer from rotating as the bolt is tightened. To the extent that the o-ring provides a seal, it is only on one side and only around the bolt. Water and air are free to infiltrate around the outside of the teeth.

U.S. Pat. Nos. 3,588,787 and 3,626,357, entitled "Electrical Connecting Washer" show a flat washer with o-rings on one side. A circular row of teeth is provided on one side of the washer, roughly midway between the central screw hole and the outer perimeter of the washer, and two o-rings radially inward and outward from the teeth provide a seal, but on one side only. This design does not bond two items, rather is intended to enhance the bond between a screw and the wall to which it is screwed. A wire could be trapped under screw head, but the electrical connection between wire and screw, or screw and washer, remains open to corrosion.

SUMMARY OF THE INVENTION

The bonding device electrically bonds metallic surfaces through serrated metal teeth which embed into each metal surface as a fastener is tightened. A sealing material circumferentially outward and inward from the teeth create an air-tight and water-tight seal around the teeth, protecting the bonding location. The device can have an extended central collar extending axially from the through-hole in the center of the device, which will allow it to be installed in holes, or on a stud without the use of adhesives or other retaining methods.

DETAILED DESCRIPTION OF THE INVENTION

Figure 1:
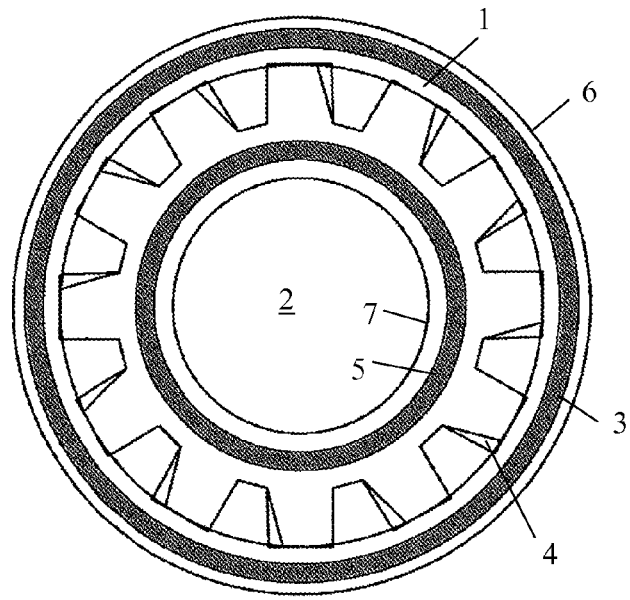
FIG. 1 shows a top view of a first embodiment of the invention.
Figure 2:
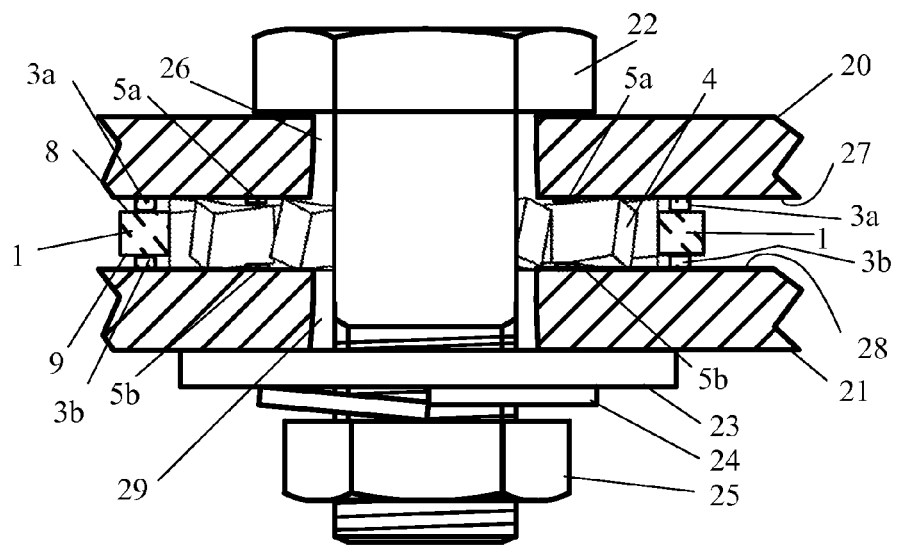
FIG. 2 shows a sectional view of the embodiment of FIG. 1 in use.
Figure 3:
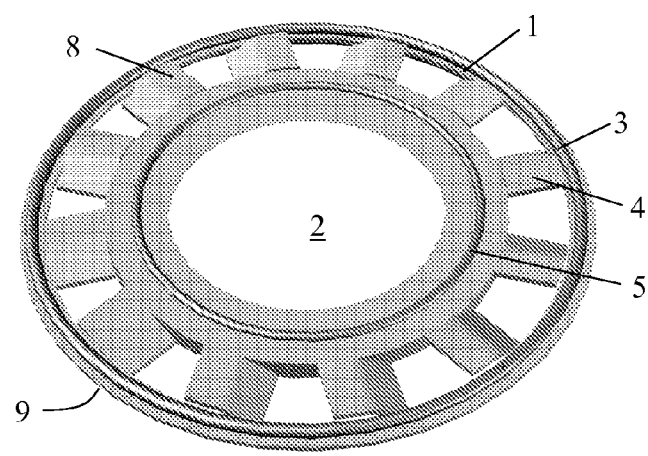
FIG. 3 shows a perspective view of the embodiment of FIG. 1.
Figure 4:
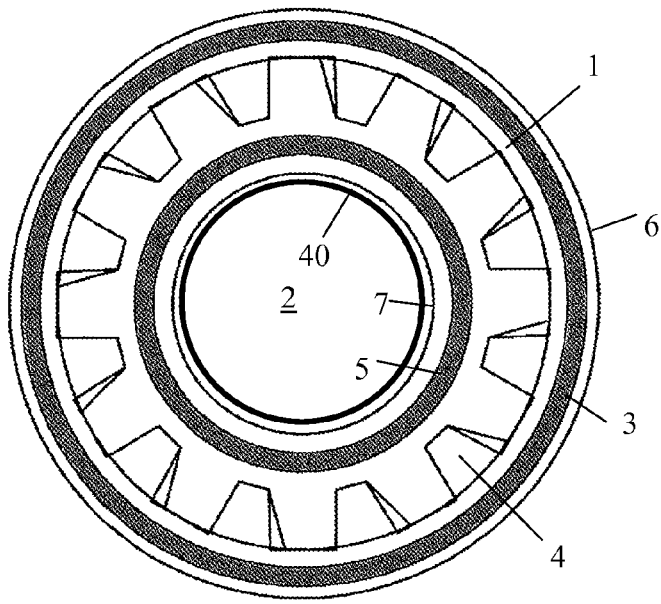
FIG. 4 shows a top view of a second embodiment of the invention.

Referring to FIGS. 1 to 3, a first embodiment of the bonding device of the invention has a generally circular metallic body 1 with an outer perimeter 6 and an inner perimeter 7 surrounding a central hole 2 through which a fastener may pass. A plurality of serrated metal teeth 4 are provided between the inner perimeter 7 and outer perimeter 6. These teeth protrude axially outward from the upper surface 8 and lower surface 9 of the body 1.

The teeth 4 can be any shape or pattern of shapes which will pierce and or cut the surface of the adjacent material, for example the bent or serrated teeth shown in the figures, or cones, points, squares, a cut or punched pattern into the surface of the body 1, or other designs known to the art.

The metallic body 1 can be made of any rigid metal or other conductive material, as is known for use in prior art toothed washers. The particular metal used can depend on the nature of the metal surfaces to be bonded—it will be understood by one known to the art that it can be desirable to avoid contact between certain dissimilar metals due to the possibility of galvanic corrosion or RF noise effects. The metal can be coated or plated with a conductive coating or metal layer.

Outer seals 3 are located on the upper surface 8 and lower surface 9, circumferentially between the outer perimeter 6 and the teeth 4. Also, inner seals 5 are located on the upper surface 8 and lower surface 9, circumferentially between the inner perimeter 7 and the teeth 4. The inner seals 3 and outer seals 5 are made of resilient sealing material, such as synthetic or natural rubber, silicone, neoprene or other material known to the art which can withstand outdoor exposure and compressive forces.

FIG. 2 shows the invention in use between two frames 20 and 21 which are to be electrically bonded. The device is placed between the lower surface 27 of upper frame 20, and the upper surface 28 of frame 21, respectively. It will be understood that while the terms "upper" and "lower" are used in this explanation with respect to frames and surfaces for ease of discussion, no actual directionality is to be implied—the frames and device could be horizontal as shown, or vertical, or at any angle. Therefore, for the purposes of this explanation the "upper surface" of the body or frame and the "lower surface" of the body or frame are merely designations for the opposing faces, whether they are actually upper or lower, left or right, or whatever.

The central hole 2 of the body 1 is centered between hole 26 in frame 20 and hole 29 in frame 21. A fastener, such as hex bolt 22, is passed through the holes 26, 2 and 29, and a nut 25 is threaded onto the bolt 22. If desired, a conventional flat washer 23 and lock washer 24 can be used between the nut 25 and the frame 21, as is normal in such applications.

As the fastener is tightened by rotating bolt 22 or nut 25, or both, the teeth 4 of the body 1 embed into each metal surface 27 and 28 at a bonding location around the device, creating an electrical bond from frame 20 to frame 21 through the device. At the same time, the inner seal 5a and outer seal 3a are compressed to create an air-tight and water-tight seal around the teeth 4 between the upper surface 8 of the body 1 and the lower surface 27 of upper frame 20. Similarly, the inner seal 5b and outer seal 3b are compressed to create an air-tight and water-tight seal around the teeth 4 between the lower surface 9 of the body 1 and the upper surface 28 of lower frame 21.

These air-tight and water-tight seals both radially inward and radially outward from the teeth and on both the upper surface and lower surface of the device protect the bonding location from corrosion or other deterioration induced by air or water or other fluids which might surround the bond.

Although the term "frames" is used in this description, and flat plates are shown in the figures for simplicity, it will be understood that this term is intended to cover any conductive elements which need to be electrically bonded, including bonding mounts or straps to beams or surfaces of structures, and any other application. Similarly, the term "hole" is meant to encompass not just through-holes in flat frames as shown in the figures, but anything through which a fastener may pass, for example a threaded bore into a solid piece of metal, or the opening created by driving in a self-tapping screw or rivet. "Fasteners" can be bolts as shown in the figures, or machine screws or self-tapping screws or rivets or any other structure which can hold two elements together. Because of the conductive bond through the device, the fastener itself need not be conductive if there is a need to use insulating materials or insulating coatings on the fastener.

FIGS. 4 through 7 show a second embodiment of the invention, which adds a cylindrical central collar 40 to the body 1 of the device of the first embodiment. The features of the second embodiment which are in common with the first embodiment have the same reference numbers as discussed above with respect to FIGS. 1-3, and will not be separately discussed here.

The central collar 40 is a generally cylindrical tube extending axially from the inner perimeter 7 of the body 1 of the device, in the hole 2 in the center of the body 1. The central collar 40 can be constructed from the base material of the body 1 during initial part manufacturing (that is, the body 1 and collar 40 are all one piece), or the collar 40 may be made of some other material and added to the device after initial part manufacturing.

Figure 5:
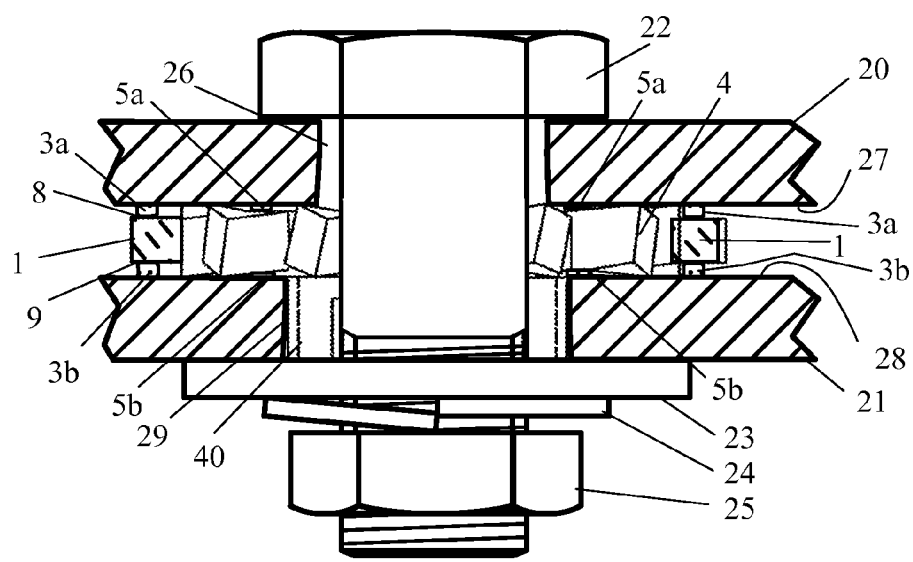
FIG. 5 shows a sectional view of the embodiment of FIG. 4 in use.
Figure 6:
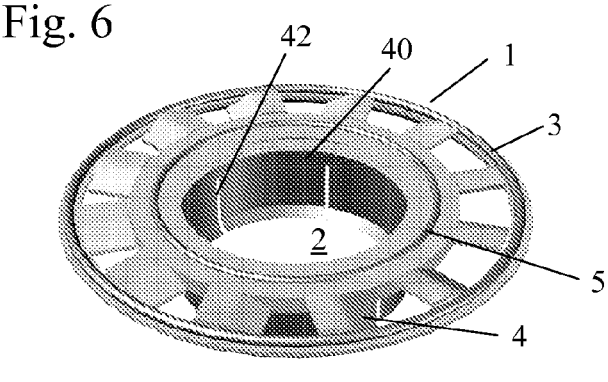
FIGS. 6 and 7 show top and bottom perspective views, respectively, of the embodiment of FIG. 4.
Figure 7:
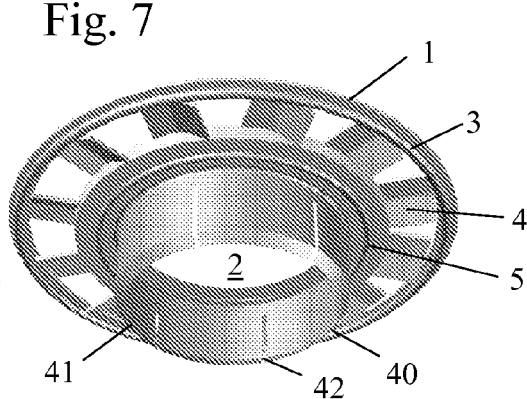

FIG. 5 shows the collar 40 inserted into hole 29 in lower frame 21, although it could equally easily have been inserted into hole 26 in upper frame 20, if that hole were of the proper size. By inserting the collar 40 into the hole 29, the device can be pre-installed on the frame 21, eliminating the need to center the device between holes 26 and 29 in the frames 20 and 21 during the assembly of the parts. The central collar 40 will allow the device to be installed in holes, or on a stud, without the use of adhesives or other retaining methods, holding the bonding device in place as the frames are assembled. The fastener 22 passes through the center of the collar 40, and functions as explained above with respect to the first embodiment.

Preferably, the collar 40 is formed with a tapered leading edge 41 on the end which is axially away from the body 1, which facilitates insertion of the collar into a hole. Axial slots 42 may cut into the collar 40 from leading edge 41, which will provide a degree of flexibility and compressibility as the collar 40 is pushed into a hole.

Figure 8:
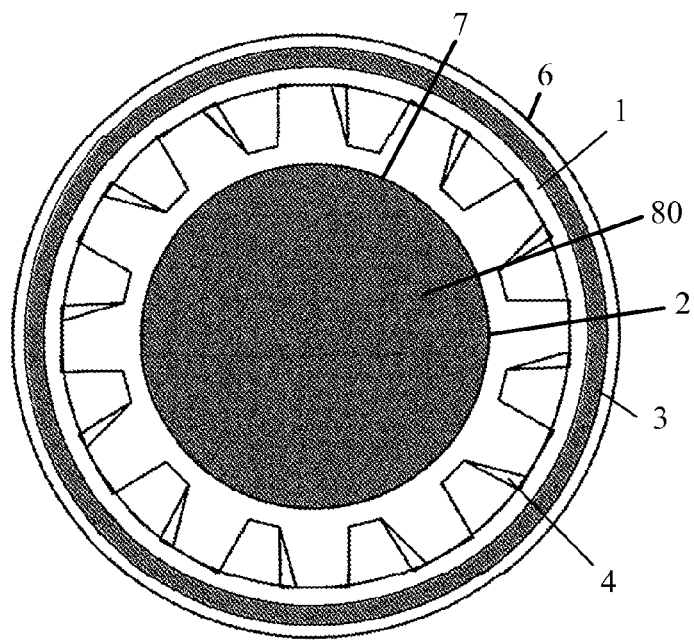
FIG. 8 shows a top view of a third embodiment of the invention.
Figure 9:
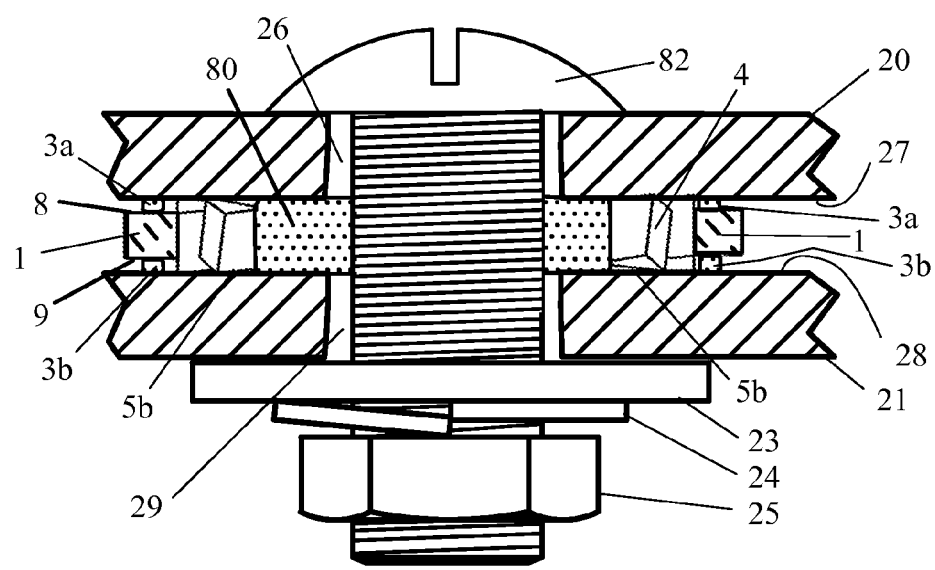
FIG. 9 shows a sectional view of the embodiment of FIG. 8 in use.
Figure 10:
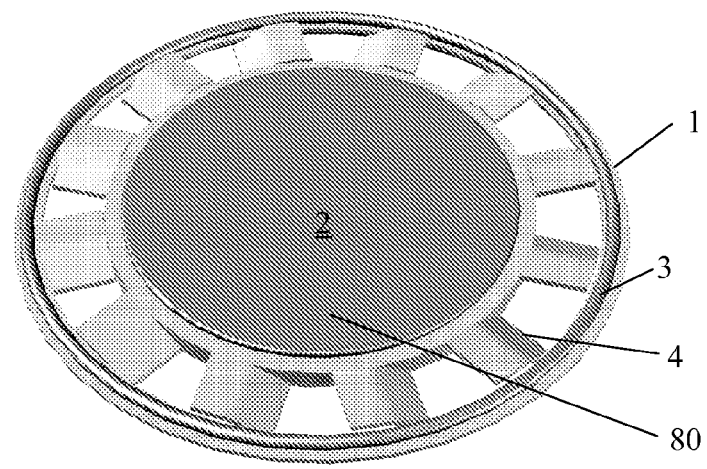
FIG. 10 shows a perspective view of the embodiment of FIG. 8.

FIGS. 8 through 10 show a third embodiment of the invention, in which the hole 2 in the center of the body 1 is filled with a disc 80 of the seal material. As with the second embodiment, the features of this third embodiment which are in common with the first embodiment have the same reference numbers as discussed above with respect to FIGS. 1-3, and will not be separately discussed here.

A fastener, in this case a screw 82, can puncture through the disc 80 of seal material when the screw 82 is passed through the holes 26 and 29, and a nut 25 is threaded onto the screw 82. If desired, a conventional flat washer 23 and lock washer 24 can be used between the nut 25 and the frame 21, as is normal in such applications.

Alternatively, the disc 80 of seal material may have a pre-cut hole or pilot hole in which the fastener can be aligned with and engage. In another alternative embodiment, other objects may be used to make a pilot hole in the disc 80 of the seal material, for example by pushing the disc 80 of seal material over a stud, with the stud puncturing the seal material of the disc 80 and creating a small pilot hole or by drilling a hole in the seal material of the disc 80.

As the fastener is tightened by rotating screw 82, or nut 25 or both, the threads of the screw 80 engage the disc 80 of seal material and the teeth 4 of the body 1 embed into each metal surface 27 and 28 at a bonding location around the device, creating an electrical bond from frame 20 to frame 21 through the device. At the same time, the inner seal 5a and outer seal 3a are compressed to create an air-tight and water-tight seal around the teeth 4 between the upper surface 8 of the body 1 and the lower surface 27 of upper frame 20. Similarly, the inner seal 5b and outer seal 3b are compressed to create an air-tight and water-tight seal around the teeth 4 between the lower surface 9 of the body 1 and the upper surface 28 of lower frame 21.

Figure 12:
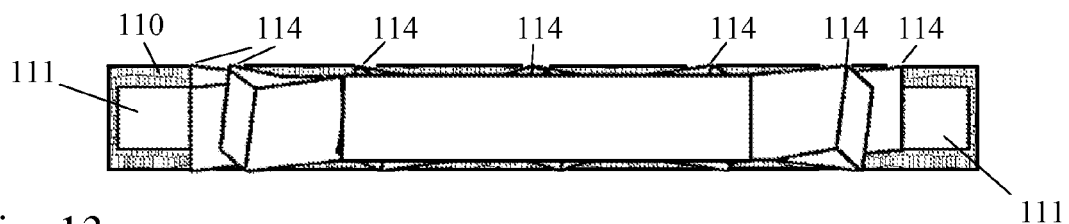
FIG. 12 shows a partially cut-through side view of a device, in an additional embodiment.
Figure 13:
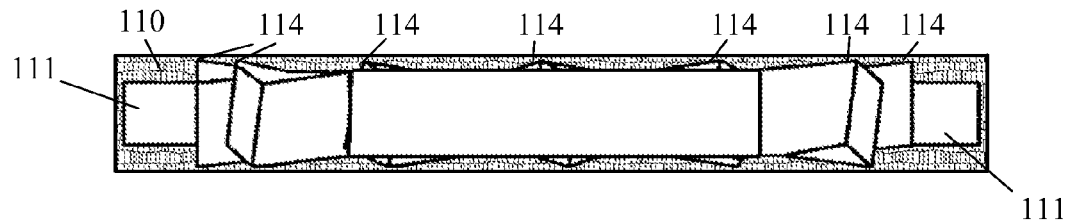
FIG. 13 shows a partially cut-through side view of a device, in a variation on the embodiment of FIG. 12.

Referring to FIGS. 12 and 13, it can be seen that in any of the above embodiments, the teeth 114 of the body 111 may be covered in a sealing material 110. The teeth 114 can slightly protrude from the material 110, as is shown in FIG. 12, or be minimally covered, as shown in FIG. 13. When the fastener is tightened, the teeth 114 of the body can penetrate or break through the seal material 110 to embed into each metal surface at a bonding location around the device.

Figure 11:
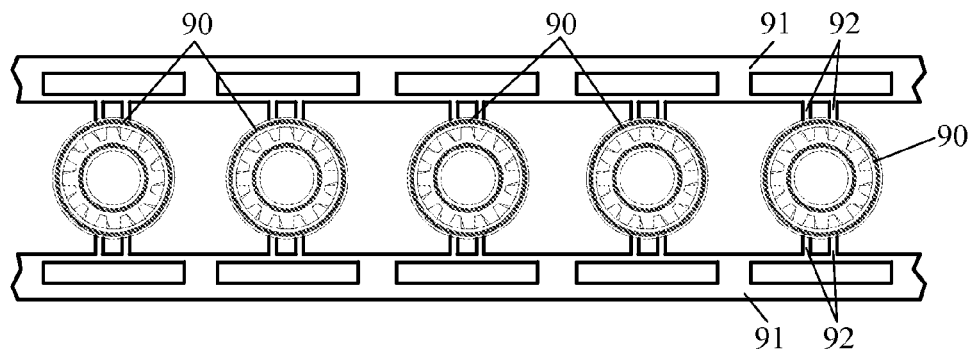
FIG. 11 shows how a plurality of bonding devices can be grouped for installation.

FIG. 11 shows how a plurality of bonding devices 90 can be grouped for installation. A group of five devices 90 are shown, but it will be understood that any number of devices can be connected together for packaging or installation purposes. Each of the devices 90 is connected to a pair of parallel carrier strips 91 by transverse connector strips 92. The devices 90 may be sold in rolls by coiling the carrier strips 91, in the same way that electronic solderless connectors are commonly sold. For simultaneous installation of a group of devices 90, a segment of a strip can be cut off, for example a five-device strip as shown in the figure, and then the devices 90 can be installed as described above. After installation, the carrier strips 91 can be removed by breaking the connector strips 92, or the carrier strips 91 may be left on if desired.

Figure 14:
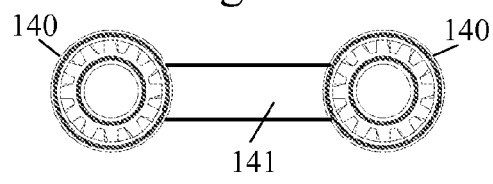
FIG. 14 shows an embodiment of the invention with two linked bonding devices.
Figure 15:
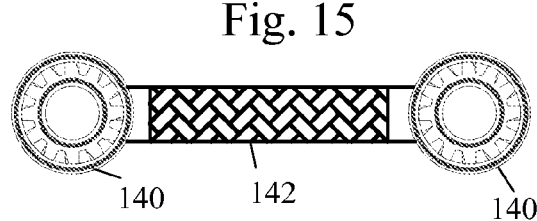
FIG. 15 shows a variation on the embodiment of FIG. 14.

FIGS. 14 and 15 show embodiments of the invention, in which two or more bonding devices 140 are connected by a conductive link 141 or 142, so that spaced-apart bonding devices can be installed together. In FIG. 14 the two bonding devices 140 are linked by a solid strap 141, which can be soldered or braised to the devices 140, or stamped out along with the devices 140 so as to form one unitary structure. FIG. 15 shows a variation in which the link 142 between the devices 140 is at least in part formed by a braided strap or wires. It will be understood that the links may be of any desired length as may be required by the application.

Figure 16:
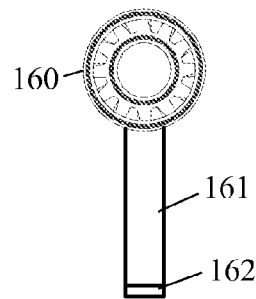
FIG. 16 shows a top view of an embodiment of the invention with a locating tab.
Figure 17:
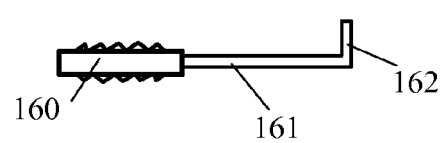
FIG. 17 shows a side view of the embodiment of FIG. 16.

FIGS. 16 and 17 show a top and side view, respectively, in which the bonding device 160 is formed with a locating tab 161. The end 162 of the locating tab 161 may be bent as shown in the figures. In this embodiment, the bonding device 160 can be easily located a fixed distance from an edge of a structure, with the tab 161 being used to place and locate the device 160, for example under a pre-drilled hole in the structure. The bent-up end 162 of the tab 161 can hook on an edge of the structure, allowing an installer to hold the device in place while two structures are brought together for fastening. As with the link 141 of the embodiment of FIG. 14, the tab 161 can be soldered or braised to the device 160, or stamped out along with the device 160 so as to form one unitary structure.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electrical bonding device comprising:
   a) a metallic body having an upper surface, a lower surface, an inner perimeter surrounding a hole, an outer perimeter, and a plurality of teeth extending axially from the upper surface and the lower surface between the inner perimeter and the outer perimeter;
   b) an inner seal on the upper surface of the body, located radially inward of the teeth;
   c) an inner seal on the lower surface of the body, located radially inward of the teeth;
   d) an outer seal on the upper surface of the body, located between the teeth and the outer perimeter of the body; and
   e) an outer seal on the lower surface of the body, located between the teeth and the outer perimeter of the body.

2. The electrical bonding device of claim 1, further comprising a central collar comprising a cylindrical tube extending axially from the body of the device, having a first end inside the inner perimeter of the body of the device and a second end.

3. The electrical bonding device of claim 2, in which the second end of the central collar is tapered.

4. The electrical bonding device of claim 2, in which the central collar further comprises a plurality of slots in the tube extending axially from the second end toward the first end.

5. The electrical bonding device of claim 1, in which the inner seals and outer seals are made of resilient material.

6. The electrical bonding device of claim 1, in which the body is made of metal.

7. The electrical bonding device of claim 1, in which the teeth are serrated.

8. The electrical bonding device of claim 1, in which the inner seals and the outer seals on the upper surface and lower surface are formed by covering the metallic body in a sealing material.

9. The electrical bonding device of claim 8, in which the teeth at least partially protrude from a surface of the sealing material.

10. The electrical bonding device of claim 1, further comprising a locating tab coupled to the metallic body.

11. The electrical bonding device of claim 1, further comprising a conductive link having an end coupled to the metallic body of the bonding device and an end coupled to the metallic body of another bonding device.

\* \* \* \* \*